(12) United States Patent
Dow et al.

(10) Patent No.: US 9,395,219 B1
(45) Date of Patent: Jul. 19, 2016

(54) RING-BASED MONITORING OF SENSOR MESH NETWORKS

(71) Applicant: International Business Machines Corporation, Armonk, NY (US)

(72) Inventors: Eli M. Dow, Wappingers Falls, NY (US); Michael R. Kelly, Wappingers Falls, NY (US); Harry R. Kolar, Phoenix, AZ (US); Michael L. Passow, West Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/990,156

(22) Filed: Jan. 7, 2016

(51) Int. Cl.
*G06F 19/00* (2011.01)
*G01D 18/00* (2006.01)
*H04L 29/08* (2006.01)

(52) U.S. Cl.
CPC ............... *G01D 18/00* (2013.01); *H04L 67/12* (2013.01)

(58) Field of Classification Search
CPC .............................. E21B 43/243; E21B 43/24
USPC .......................... 702/117, 118, 182–185, 188
See application file for complete search history.

(56) References Cited

U.S. PATENT DOCUMENTS

| 2005/0086300 | A1  | 4/2005 | Yeager et al. |
| 2007/0046369 | A1* | 3/2007 | Schober ............. G06K 19/0707 330/7 |
| 2009/0187983 | A1  | 7/2009 | Zerfos et al. |
| 2010/0142709 | A1  | 6/2010 | Robert et al. |
| 2012/0047098 | A1  | 2/2012 | Reem |
| 2013/0031201 | A1  | 1/2013 | Kagan et al. |

OTHER PUBLICATIONS

Bash et al., "Exact Distributed Voronoi Cell Computation in Sensor Networks" IPSN'07, Apr. 25-27, 2007, Cambridge, Massachusetts, USA, 8 pgs.
Hung-Chin Jang, "Applications of Geometric Algorithm to Reduce Interference in Wireless Mesh Network", Jpournal on Applications of Graph Theory in Wireless Ad hoc Networks and Sensor Networks, vol. 2, No. 1, Mar. 2010, 24 pgs.

* cited by examiner

*Primary Examiner* — Edward Raymond
(74) *Attorney, Agent, or Firm* — Cantor Colburn LLP; Steven Chiu

(57) ABSTRACT

A computer-implemented method includes arranging two or more sensor nodes into a ring monitor. Each sensor node of the ring monitor is coupled to a sensor and cross-monitors at least one other sensor node in the ring monitor. A request is received to add a new sensor node. A spatial partitioning of a plane is generated, by a computer processor, representing locations of the new sensor node and the two or more sensor nodes in the ring monitor. The spatial partitioning includes a plurality of regions, each region corresponding to a sensor node. Two or more adjacent sensor nodes are selected from the two or more sensor nodes in the ring monitor, based at least in part on the spatial partitioning. The two or more adjacent sensor nodes are instructed to monitor the new sensor node, which is instructed to monitor each of the two or more adjacent sensor nodes.

20 Claims, 10 Drawing Sheets

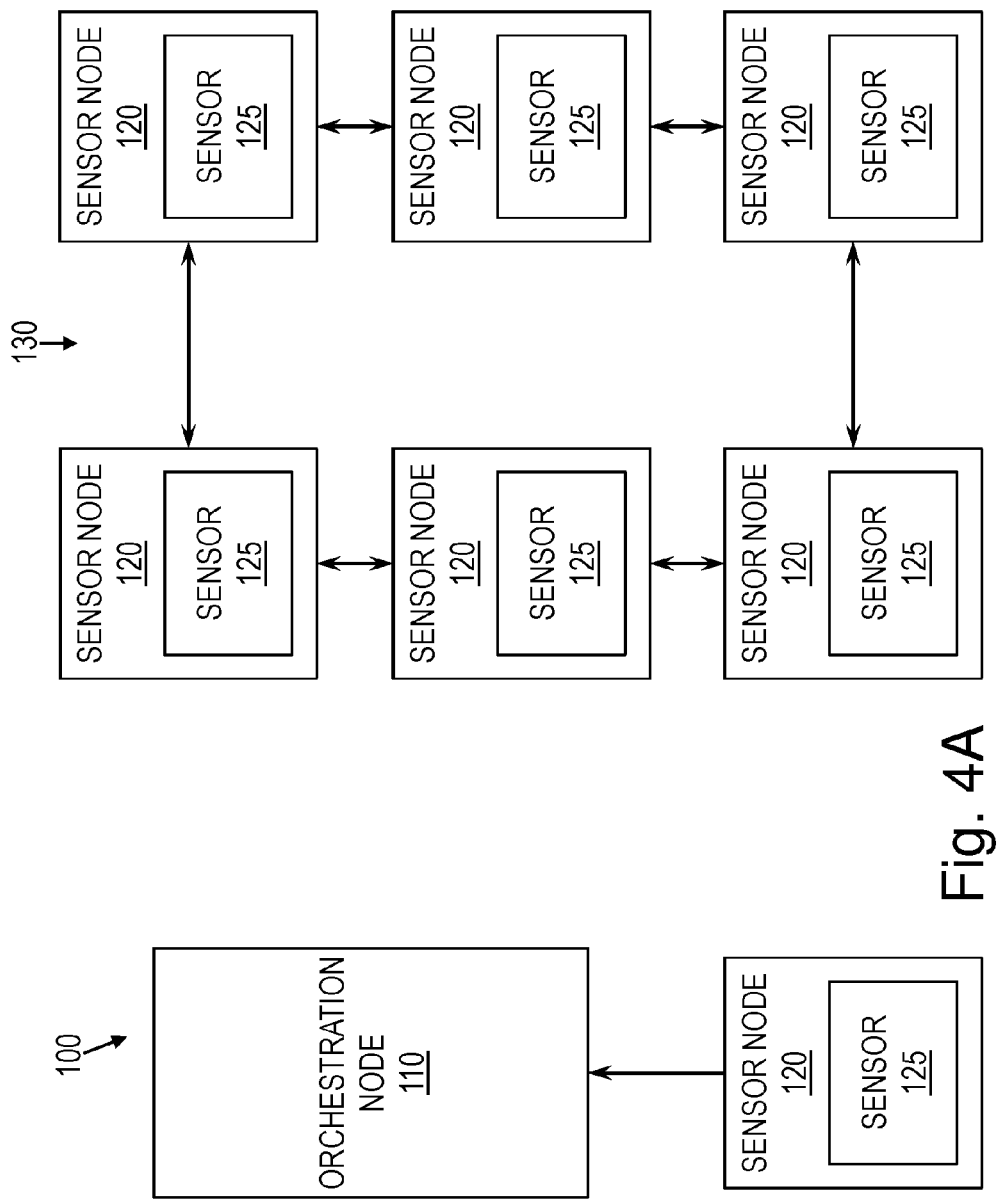

RING-BASED MONITORING OF SENSOR MESH NETWORKS

BACKGROUND

Embodiments of the present invention relate to sensor monitoring and, more specifically, to ring-based monitoring of sensor mesh networks.

Sensors are used in numerous situations to detect variables related to their environments. For instance, a sensor can be integrated into a piece of machinery to detect that the machinery is behaving properly, or a sensor may be piezoelectric and can be used to measure weather conditions or other weather conditions in its location.

Sensors are often inexpensive devices and prone to occasional failure. Unfortunately, a failure may not be detected right away, and as a result, certain environmental changes may remain undetected. For instance, in the case of a sensor that detects issues with machinery, if the sensor fails, a failure on the part of the machinery might go undetected for an extended period of time.

SUMMARY

According to an embodiment of this disclosure, a computer-implemented method includes arranging two or more sensor nodes into a ring monitor. Each sensor node of the ring monitor is coupled to a sensor, and each sensor node cross-monitors at least one other sensor node in the ring monitor. A request is received to add a new sensor node to the ring monitor. A spatial partitioning of a plane is generated, by a computer processor, representing locations of the new sensor node and the two or more sensor nodes in the ring monitor. The spatial partitioning includes a plurality of regions, and each region corresponds to a sensor node. Two or more adjacent sensor nodes are selected from the two or more sensor nodes in the ring monitor, based at least in part on the spatial partitioning. The two or more adjacent sensor nodes are instructed to monitor the new sensor node, and the new sensor node is instructed to monitor each of the two or more adjacent sensor nodes.

In another embodiment, a system includes a memory having computer readable instructions and one or more processors for executing the computer readable instructions. The computer readable instructions include arranging two or more sensor nodes into a ring monitor. Each sensor node of the ring monitor is coupled to a sensor, and each sensor node cross-monitors at least one other sensor node in the ring monitor. Further according to the computer readable instructions, a request is received to add a new sensor node to the ring monitor. A spatial partitioning of a plane is generated, by a computer processor, representing locations of the new sensor node and the two or more sensor nodes in the ring monitor. The spatial partitioning includes a plurality of regions, and each region corresponds to a sensor node. Two or more adjacent sensor nodes are selected from the two or more sensor nodes in the ring monitor, based at least in part on the spatial partitioning. The two or more adjacent sensor nodes are instructed to monitor the new sensor node, and the new sensor node is instructed to monitor each of the two or more adjacent sensor nodes.

In yet another embodiment, a computer program product for monitoring a sensor mesh network includes a computer readable storage medium having program instructions embodied therewith. The program instructions are executable by a processor to cause the processor to perform a method. The method includes arranging two or more sensor nodes into a ring monitor. Each sensor node of the ring monitor is coupled to a sensor, and each sensor node cross-monitors at least one other sensor node in the ring monitor. Further according to the method, a request is received to add a new sensor node to the ring monitor. A spatial partitioning of a plane is generated, by a computer processor, representing locations of the new sensor node and the two or more sensor nodes in the ring monitor. The spatial partitioning includes a plurality of regions, and each region corresponds to a sensor node. Two or more adjacent sensor nodes are selected from the two or more sensor nodes in the ring monitor, based at least in part on the spatial partitioning. The two or more adjacent sensor nodes are instructed to monitor the new sensor node, and the new sensor node is instructed to monitor each of the two or more adjacent sensor nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 4A-4C are block diagrams of the monitoring system, when adding the new sensor node to the ring of sensor nodes, according to some embodiments of this disclosure;

DETAILED DESCRIPTION

Various embodiments of this disclosure provide ring-based monitoring of sensors, enabling efficient detection of failures and efficient addition of new sensors to replace the failed ones, with low overhead involved in monitoring the sensors. Further, some embodiments are scalable and thus operable both for a small number of sensors as well as for a large number.

Figure 1:
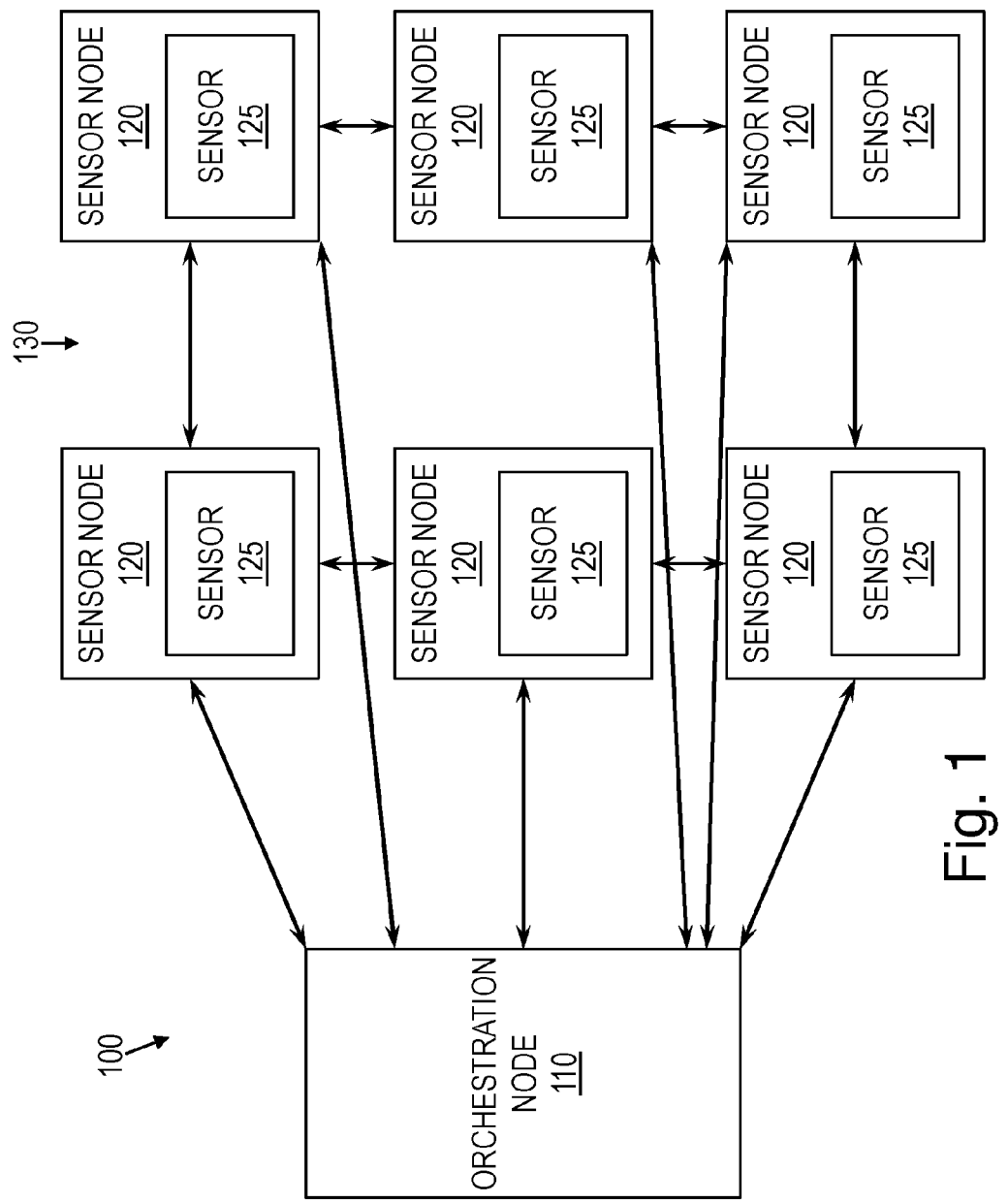
FIG. 1 is a block diagram of a monitoring system, according to some embodiments of this disclosure.

FIG. 1 is a block diagram of a monitoring system 100, according to some embodiments of this disclosure. As shown, the monitoring system 100 may include at least one orchestration node 110 and two or more sensor nodes 120. The sensor nodes 120 may monitor one another in the form of a ring 130, also referred to as a ring monitor 130, which will be discussed further below. The ring 130 may behave as an Internet of Things (IoT) mesh network, with each sensor node 120 being an IoT device. Although six sensor nodes 120 are shown in FIG. 1, it will be understood that the ring 130 may include a fewer or greater number of sensor nodes 120. In some embodiments, each sensor node 120 may be integrated with or otherwise coupled to a sensor 125, which, for instance, may be configured to detect conditions of an object or environment. The orchestration node 110 may manage the ring 130 of sensor nodes 120, as will also be discussed further below.

The monitoring system 100 may be a ring-based peer-to-peer system for enabling seamless scale out of sensor networks to reduce single points of failure. Further, the monitoring system 100 may implement no-overhead or low-overhead monitoring while ensuring that each sensor node 120 monitors peers that are geographically adjacent and are thus reasonable comparators for outlier detection.

More specifically, each first sensor node 120 may monitor one or more peer sensor nodes 120 adjacent to it within the ring 130. This monitoring may be achieved by way of the adjacent sensor nodes 120 delivering periodic heartbeat packets to the first sensor node 120. Similarly, the first sensor node 120 may send heartbeat packets to its adjacent sensor nodes 120, which may monitor the first sensor node 120 as well. In other words, there may exist cross-monitoring, or monitoring reciprocity, between the first sensor node 120 and each of its adjacent sensor nodes 120.

The regularity of the heartbeat packets may be based at least in part on the importance of the sensors 125 and the necessity to discover failures sooner rather than later. Discovery of failures may be achieved earlier when heartbeat packets are delivered more frequently, as opposed to less frequently. When the first sensor node 120 does not receive an expected heartbeat packet from an adjacent sensor node 120, the first sensor node 120 may then determine that the adjacent sensor node 120, and thus the sensor 125 coupled to the adjacent sensor node 120, has failed.

In some embodiments, the heartbeat packets may serve double duty as both a heartbeat and an outlier detection payload. In other words, each heartbeat packet the first sensor node 120 transmits may include an outlier detection payload. This outlier detection payload may include data useable to determine whether the sensor 125 coupled to the sensor node 120 is operating as expected. For instance, the outlier detection payload may include data describing information detected by the sensor. Similarly, the first sensor node 120 may receive an outlier detection payload in each heartbeat packet received from its adjacent sensor nodes 120. The first sensor node 120 may thus compare data in the outlier detection packet it receives from a second sensor node 120, which is adjacent to the first sensor node 120, to data in other outlier detection packets.

The other outlier detection packets used for the comparison may be one or more previous outlier detection packets received from the second sensor node 120, one or more outlier detection packets received from the other adjacent sensor node 120, information detected by the sensor 125 of the first sensor node 120, or a combination of these. Based on the comparison, the first sensor node 120 may determine whether the second sensor node 120 is providing outlier data. If it is determined that the second sensor node 120 is providing outlier data, the first sensor node 120 may report this to the orchestration node 110, which may decide whether to take the second sensor node 120 and associated sensor 125 offline.

The orchestration node 110 may manage the ring 130 of sensor nodes 120. In some embodiments, the orchestration node 110 may be highly available, particularly if only a single orchestration node 110 is being used. For example, and not by way of limitation, the sensor nodes 120 may be lightweight devices, while the orchestration node 110 may be a server capable of managing the various sensor nodes 120. In some embodiments, some redundancy may be built into the orchestration node 110 to assist in keeping it highly available. For instance, the orchestration node 110 may be connected to a backup orchestration node 110, which may take over management operations if it detects that the orchestration node 110 has failed.

The orchestration node 110 may handle various tasks in management of the ring 130 of sensor nodes 120. For example, the orchestration node 110 may instruct each sensor node 120 to perform tasks to enable monitoring its adjacent sensor nodes 120, such that the sensor nodes 120 together form the ring 130. For instance, upon assigning a first sensor node 120 and a second sensor node 120 to monitor each other, the orchestration node 110 may instruct the first and second sensor nodes 120 to transmit heartbeat packets to each other and to expect heartbeat packets from each other, thus enabling that monitoring. When the orchestration node 110 no longer wishes this monitoring to continue, the orchestration node 110 may instruct the first and second sensor nodes 120 to stop sending the heartbeat packets to each other and to stop expecting them.

In some embodiments, the orchestration node 110 may manage which sensor nodes 120 are allowed to participate in the monitoring system 100. For example, and not by way of limitation, a sensor node 120 that has failed one or more times may no longer be allowed to participate. If the orchestration node 110 decides to remove a sensor node 120 from the monitoring system 100 for future use, the orchestration node 110 may direct that sensor node 120 to send no further requests to participate in the monitoring system 100. Upon receiving this instruction, the sensor node 120 may no longer request to participate, and may thus not be added to the ring 130 in the future.

In some embodiments, each orchestration node 110 may also manage a list of the set of orchestration nodes 110. In other words, each orchestration node 110 may be aware of other orchestration nodes 110, if any, and may know their IP addresses as well as their authentication credentials, if applicable. Each orchestration node 110 may be configured to add a new orchestration node 110 to the monitoring system 100, by adding the IP address and, if applicable, authentication credentials of the new orchestration node 110 to the list of orchestration nodes 110 in use. Each orchestration node 110 may also be configured to remove an old orchestration node 110 from the monitoring system 100, by removing from the list the IP address and, if applicable, authentication credentials of the old orchestration node 110. Each orchestration node 110 on the list, and thus recognized by other orchestration nodes 110 and therefore by the sensor nodes 120, may be able to perform the tasks of an orchestration node 110 as described in this disclosure.

Figure 2:
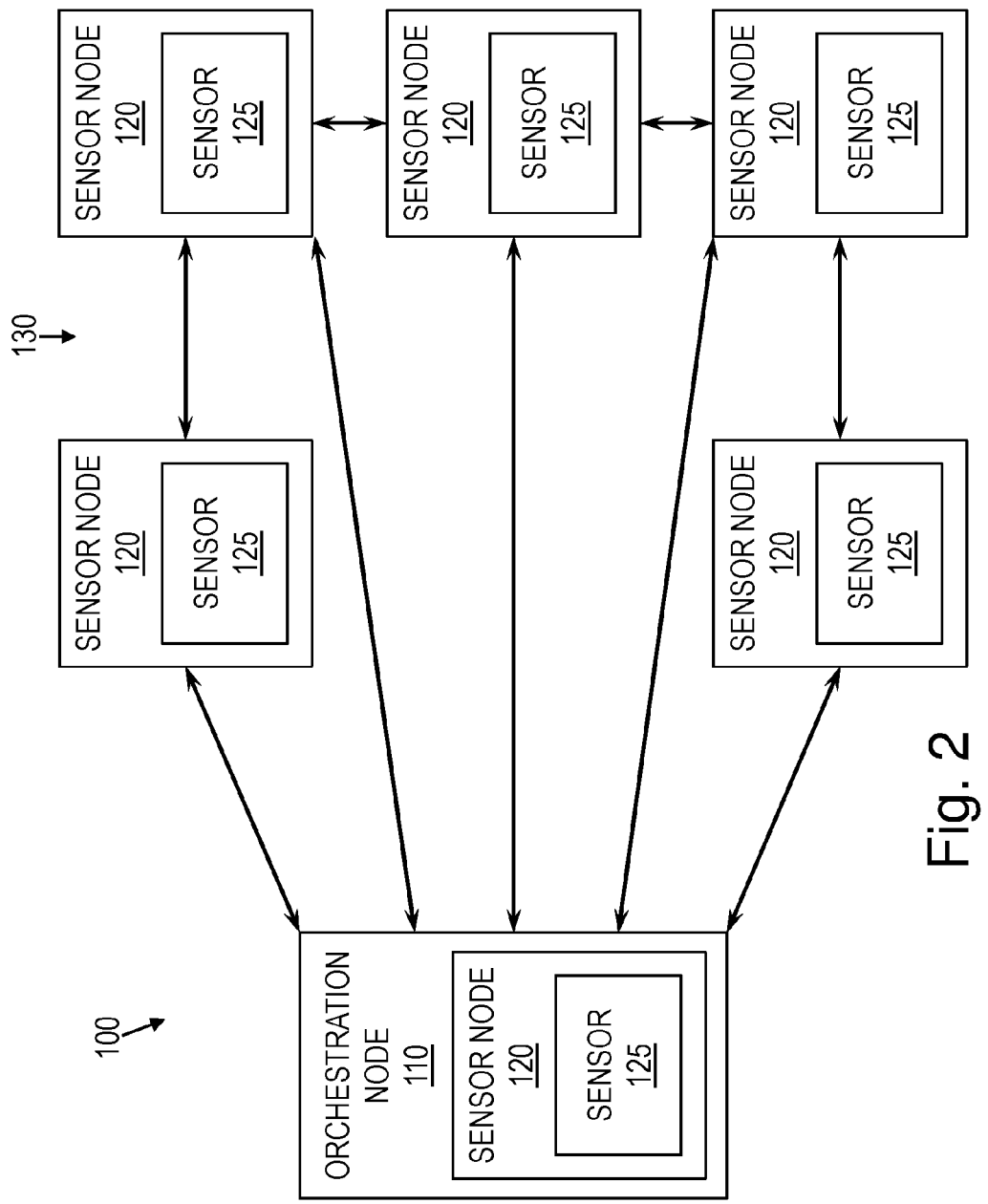
FIG. 2 is another block diagram of the monitoring system, according to some embodiments of this disclosure.

FIG. 2 is another block diagram of the monitoring system 100, according to some embodiments of this disclosure. As shown, in some embodiments, the orchestration node 110 may be integrated with a sensor node 120, such that the orchestration node 110 and the sensor node 120 share hardware, software, or both.

In some instances, when the monitoring system 100 comes online, the orchestration node 110 may be selected from the sensor nodes 120 requesting to participate in the monitoring system 100. For example, and not by way of limitation, the various sensor nodes 120 may vote on which one or more sensor nodes 120 among them should act as orchestration nodes 110. For another example, the sensor nodes 120 may each have a predetermined list of sensor nodes 120 capable of acting as orchestration nodes 110, and one or more sensor nodes 120 on the list may become orchestration nodes 110. In either case, in some embodiments, a sensor node 120 may be required to meet certain criteria before being selected as an orchestration node 110. For instance, the sensor node 120 may be required to be highly available and to have appropriate hardware and software for managing other sensor nodes 120.

In some embodiments the monitoring system 100 may be scalable and, further, may grow with additional sensor nodes 120 or shrink as sensor nodes 120 are removed. For instance, the monitoring system 100 may initially be established with two or more sensor nodes 120, as discussed below, and each additional sensor node 120 may be added to the ring 130.

When the monitoring system 100 initially comes online, the orchestration node 110 may broadcast or multicast an announcement that the monitoring system 100 is now online. Each sensor node 120 available to participate in the monitoring system 100 may communicate to the orchestration node 110 its request to participate. To communicate this request, a sensor node 120 may broadcast its desire to participate, and that broadcast may be received by the orchestration node 110. In some embodiments, however, the sensor node 120 may be able to determine the internet protocol (IP) address of the orchestration node 110, such as by way of domain name system service discovery (DNS-SD). In this case, the sensor node 120 may transmit its desire to participate directly to the orchestration node 110, such as by way of multicast or unicast.

Upon receiving requests from various sensor nodes 120 after the monitoring system 100 comes online, the orchestration node 110 may link the sensor nodes 120 together into the ring 130. For example, and not by way of limitation, the orchestration node 110 may begin with two sensor nodes 120 in the ring 130, and may add each additional sensor node 120 one at a time. In some embodiments, as the monitoring system 100 remains online, additional sensor nodes 120 may be added to the ring 130 one at a time, and sensor nodes 120 may be removed from the ring 130 due to detected failures or other reasons.

Figure 3:
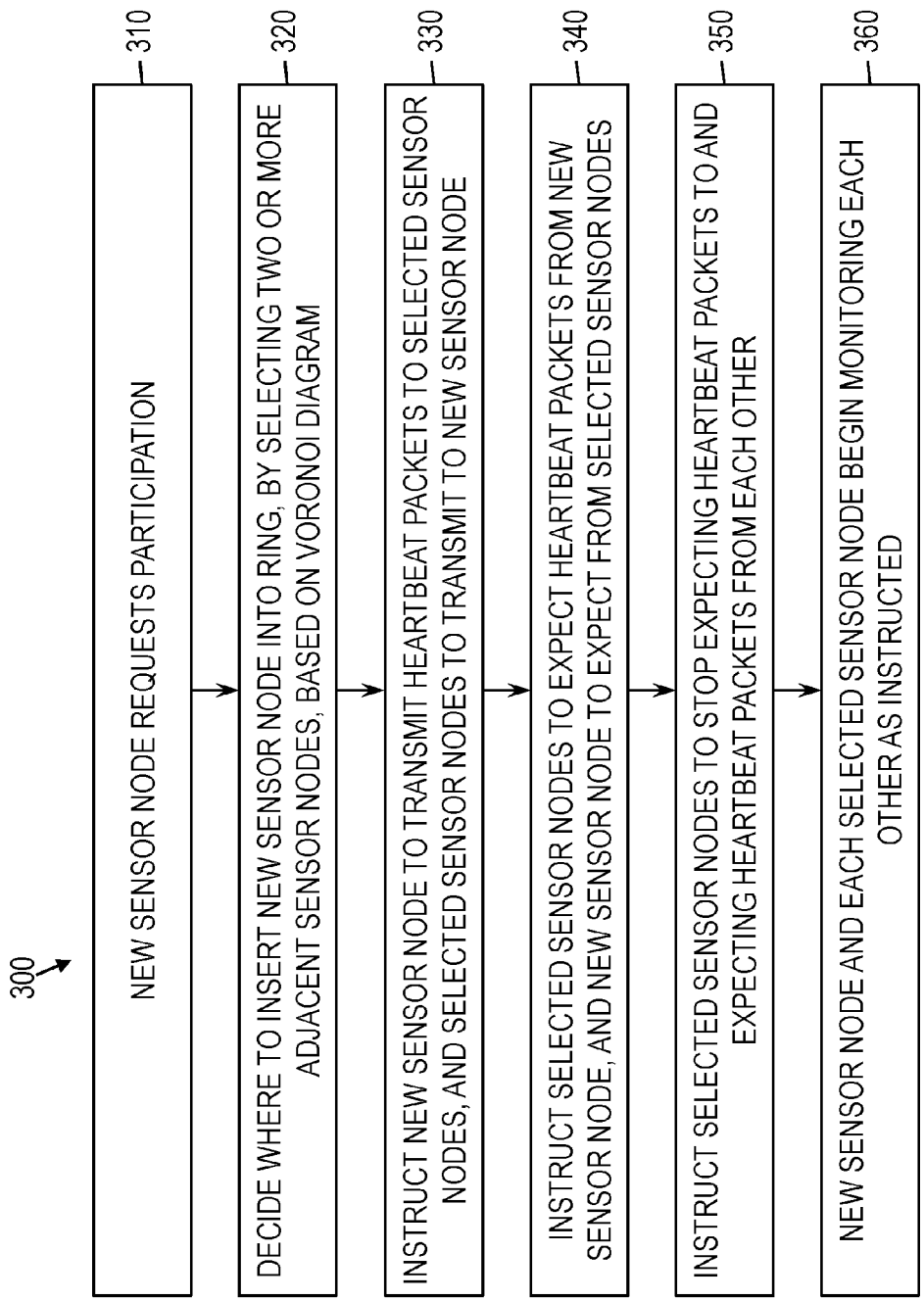
FIG. 3 is a flow diagram of a method for adding a new sensor node to a ring of sensor nodes, according to some embodiments of this disclosure.

FIG. 3 is a flow diagram of a method 300 for adding a sensor node 120 to the ring 130, according to some embodiments of this disclosure. In some embodiments, this method 300 may apply both to sensor nodes 120 that request to participate when the monitoring system 100 comes online, as well as sensor nodes 120 that make their requests later.

At bock 310, a new sensor node 120 may request participation in the monitoring system 100. The new sensor node 120 may be "new" in the sense that it is not currently part of the ring 130 of sensor nodes 120. Making the request to participate may occur when the new sensor node 120 initially powers on or comes online. To communicate participation, the sensor node 120 may broadcast its desire to participate, and that broadcast may be received by the orchestration node 110. In some embodiments, however, the new sensor node 120 may be able to determine the IP address of the orchestration node 110, and in this case, the new sensor node 120 may transmit its desire to participate directly to the orchestration node 110, such as by way of multicast or unicast.

FIG. 4A is a block diagram of the monitoring system 100, upon receiving this request, according to some embodiments of this disclosure. As shown, the new sensor node 120 may communicate with the orchestration node 110 to request participation.

Referring back to FIG. 3, at block 320, the orchestration node 110 may decide where in the current ring 130 to place the new sensor node 120. More specifically, the orchestration node 110 may select one or more sensor nodes 120 to be adjacent to (i.e., to monitor and be monitored by) the new sensor node 120. These selected sensor nodes 120 may become adjacent sensor nodes 120 to the new sensor node 120, when the new sensor node 120 is added to the ring 130. In some embodiments, if the ring 130 currently includes only a single sensor node 120, as may be the case if the monitoring system 100 recently came online, or if sensor nodes 120 have been removed, that single sensor node 120 may be selected to monitor the new sensor node 120 and to be monitored by the new sensor node. In other cases, in some embodiments, the orchestration node 110 may select two sensor nodes 120 currently adjacent to each other in the ring 130 for the new sensor node 120 to monitor, and to monitor the new sensor node 120.

In selecting adjacent sensor nodes 120 for the new sensor node 120, the orchestration node 110 may consider geospatial proximal sensor nodes 120 in the ring 130, as well as sensor nodes 120 in the ring 130 with highly correlated sensor packages and value readings. In other words, the orchestration node 110 may seek other sensor nodes 120 that are similar to the new sensor node 120 in location, type of sensor 125, or both. As a result, heartbeat packets received during monitoring may effectively act as outlier detection packets, given that data captured by the sensor 125 of the new sensor node 120 and its adjacent sensor node 120 may be similar.

In some embodiments, selection of adjacent sensor nodes 120 for the new sensor node 120 may be determined at least in part by spatial partitioning of a plane based on locations of the sensor nodes 120 that are in the ring 130. For instance, the adjacent sensor nodes 120 selected may be nearest neighbors to the new sensor node 120. More specifically, in some embodiments, the selection of adjacent sensor nodes 120 may be based on a Voronoi diagram of locations of the sensor nodes 120 in the ring 130. Each sensor node 120 may be aware of its own position in geophysical space. For instance, a sensor node 120 may include a global positioning system (GPS) receiver or, particularly if the sensor node is immobile, may be programmed with is position in two-dimensional or three-dimensional space. With the locations of each sensor node 120 in the ring 130, the orchestration node 110 may generate a Voronoi diagram of the sensor nodes 120 based on their locations.

Figure 5A:
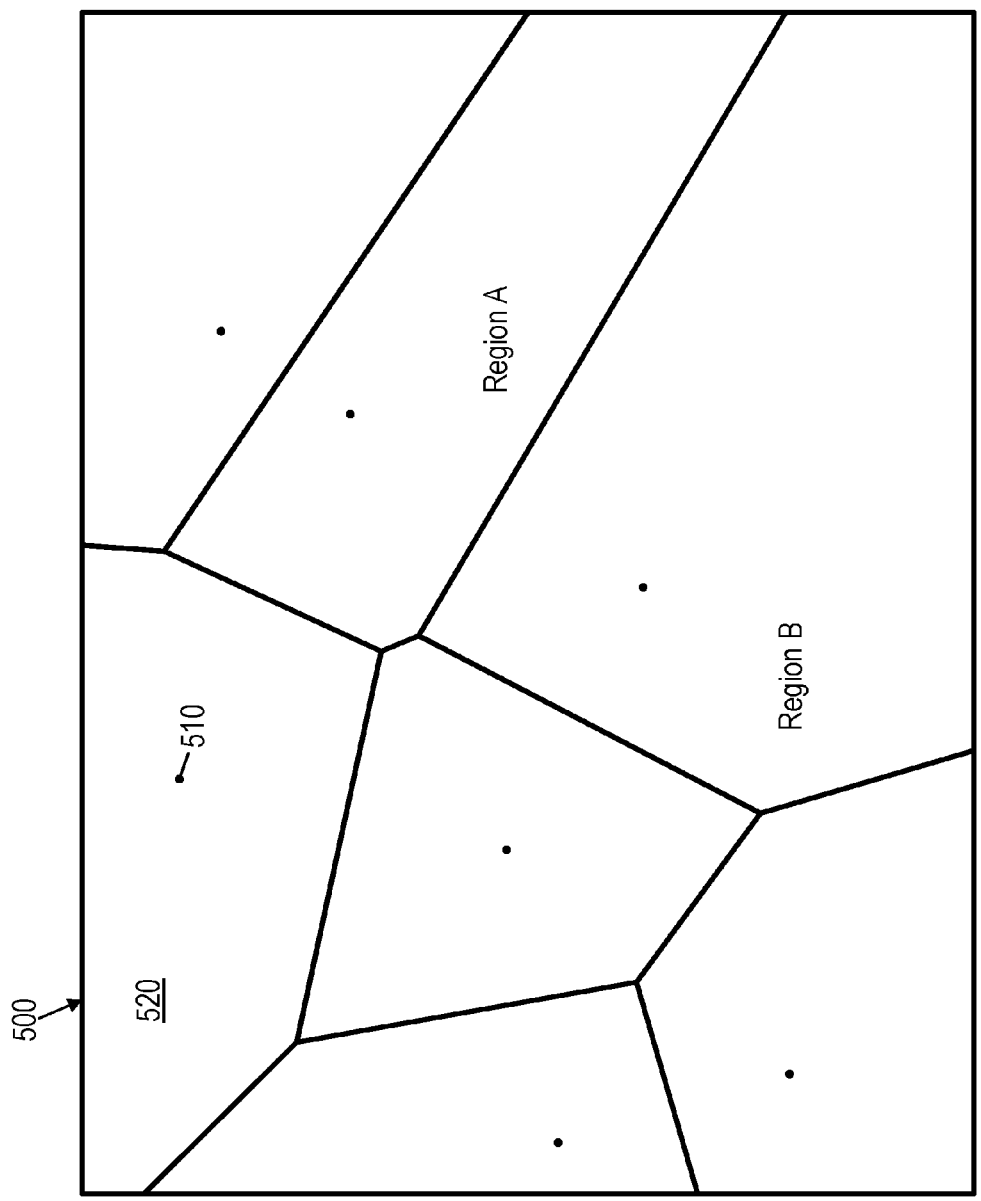
FIGS. 5A-5B illustrate example Voronoi diagrams of sensor node locations in the ring of sensor nodes, according to some embodiments of this disclosure.

FIG. 5A illustrates an example Voronoi diagram 500 of locations of sensor nodes 120 in the ring 130, according to some embodiments of this disclosure. Each point 510 in the Voronoi diagram 500 may represent a location of a corresponding sensor node 120. For example, and not by way of limitation, each point 510 in the Voronoi diagram 500 may be the geophysical position, or a projection into two-dimensional space of the geophysical position, of the sensor node 120 corresponding to that point 510.

Based on these points 510, the orchestration node 110 may generate the Voronoi diagram 500, which may be performed using a conventional method 500 based on the points 510. The Voronoi diagram 500 may include two or more regions 520, which may be polygonal, with each region 520 enclosing and corresponding to a point 510, and thus corresponding to a sensor node 120. Two of such regions 520 are labeled as Region A and Region B in the figure.

Figure 5B:
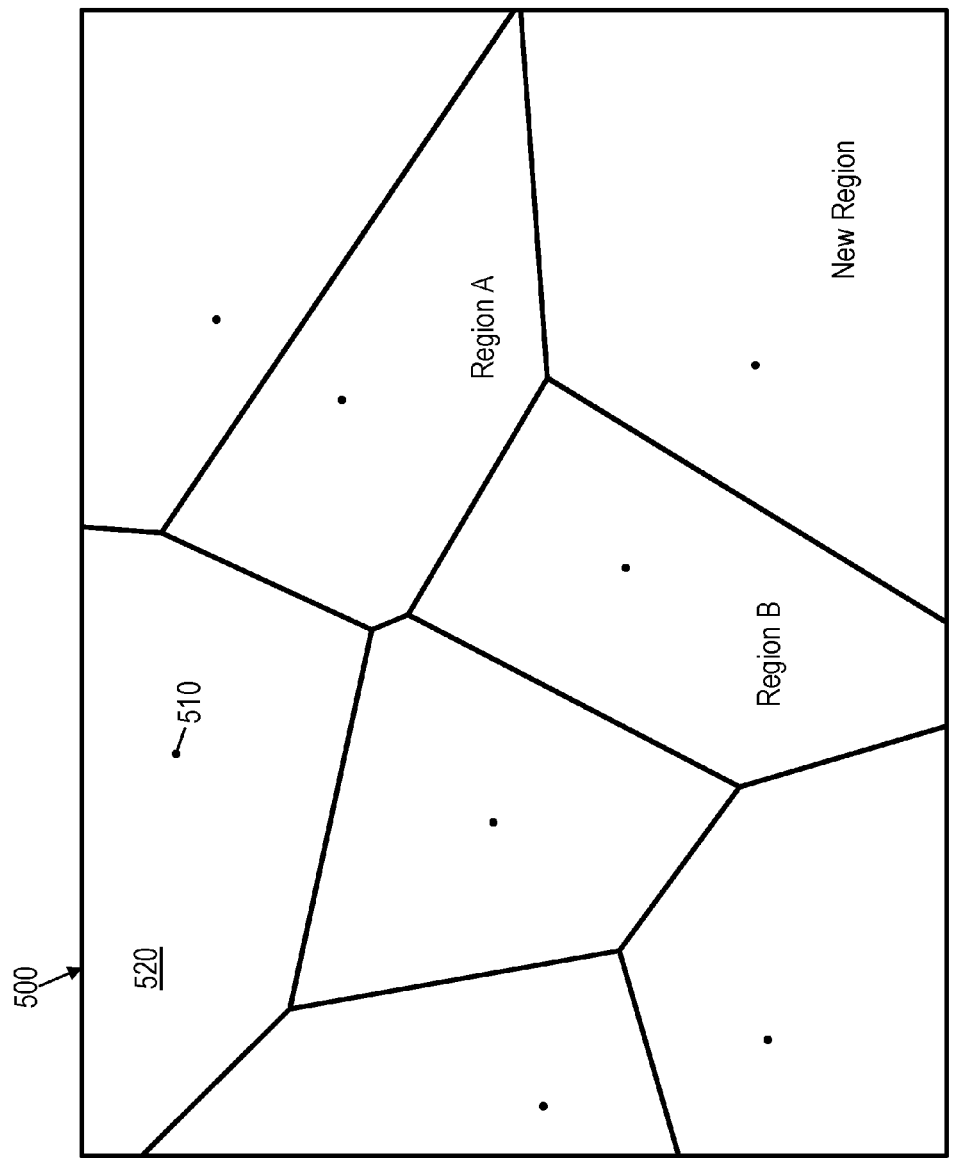

To select adjacent sensor nodes 120 for the new sensor node 120, a point 510 for new sensor node 120 and an associated surrounding region 520 may be added to the Voronoi diagram 500, representing the new sensor node's location. FIG. 5B illustrates an example Voronoi diagram 500, generated by adding to the Voronoi diagram 500 of FIG. 5B a new point 510 corresponding to the new sensor node 120, according to some embodiments of this disclosure. As shown, adjusting the Voronoi diagram 500 to account for the new point 510 includes adding a new region 520 corresponding to the new sensor node 120. In FIG. 5B the new region is labeled as such, and Region A and Region B are adjacent to the new region 520.

As shown in this example, the new region 520 in the Voronoi diagram 500 corresponding to the new sensor node 120 may be adjacent to two or more other regions 520 of the Voronoi diagram 500, Regions A and B in this case, where each region 520 represents a corresponding sensor node 120. From the Voronoi diagram 500, the orchestration node 110 may select one or more regions 520 and their corresponding to sensor nodes 120 already in the ring 130. In some embodiments, two regions 520 may be selected. The selected regions 520 may be adjacent to (i.e., bordering) the new region 520 for the new sensor node 120, and may thus be nearest neighbors of the new region 520. In some embodiments, the Voronoi diagram may be three-dimensional, in which case the new region 520 representing the new sensor node 120 may be a three-dimensional Voronoi tetrahedron rather than a two-dimensional Voronoi polygon. In some of such cases, each nearest neighbor selected as an adjacent sensor node 120 may be above or below the new sensor node 120. Additionally, in some embodiments, the selected regions 520 may represent sensor nodes 120 that are currently adjacent to each other (i.e., monitoring each other) in the ring 130. In the example of FIG. 5B, Region A and Region B are selected, and thus, the corresponding sensor nodes 120 of these regions are selected.

In some embodiments, the one or more sensor nodes 120 selected as adjacent sensor nodes 120 need not be geographical nearest neighbors to the new sensor node 120, as may be achieved through the spatial partitioning described above. Rather, one or more of the adjacent sensor nodes 120 may be nearest neighbors in a virtual sense. For instance, rather than limiting selection for adjacent sensor nodes 120 to other sensor node 120 that are similar in a geographical sense, the monitoring system 100 may select one or more other sensor nodes 120 that are similar in some other respect, such as being in a location or situation that has similar chemical, physical, or biological properties as the location or situation of the new sensor node 120. Selection in this manner may be particularly useful for outlier detection, as such an adjacent sensor node 120 may be more likely to send data that is similar to data being recorded by the sensor 125 of the new sensor node 120, thus potentially enabling more effective detection of outlier data.

Returning to FIG. 3, at block 330, the orchestration node 110 may instruct the new sensor node 120 to transmit heartbeat packets to the selected sensor nodes 120, and may instruct the selected sensor nodes 120 to transmit heartbeat packets to the new sensor node 120. At block 340, the orchestration node 110 may instruct the selected sensor nodes 120 to expect heartbeat packets from each other, and may instruct the new sensor node 120 to expect heartbeat packets from the selected sensor nodes 120. These instructions in block 330 and 340 may enable cross-monitoring between the new sensor node 120 and each of the selected sensor nodes 120.

At block 350, the orchestration node 110 may instruct the selected sensor nodes 120 to stop expecting heartbeat packets from each other, and to stop sending heartbeat packets to each other. Because the new sensor node 120 is being inserted between the selected sensor nodes 120, the selected sensor nodes 120 need not monitor each other any longer. Thus, these instructions may end this monitoring.

Figure 4B:
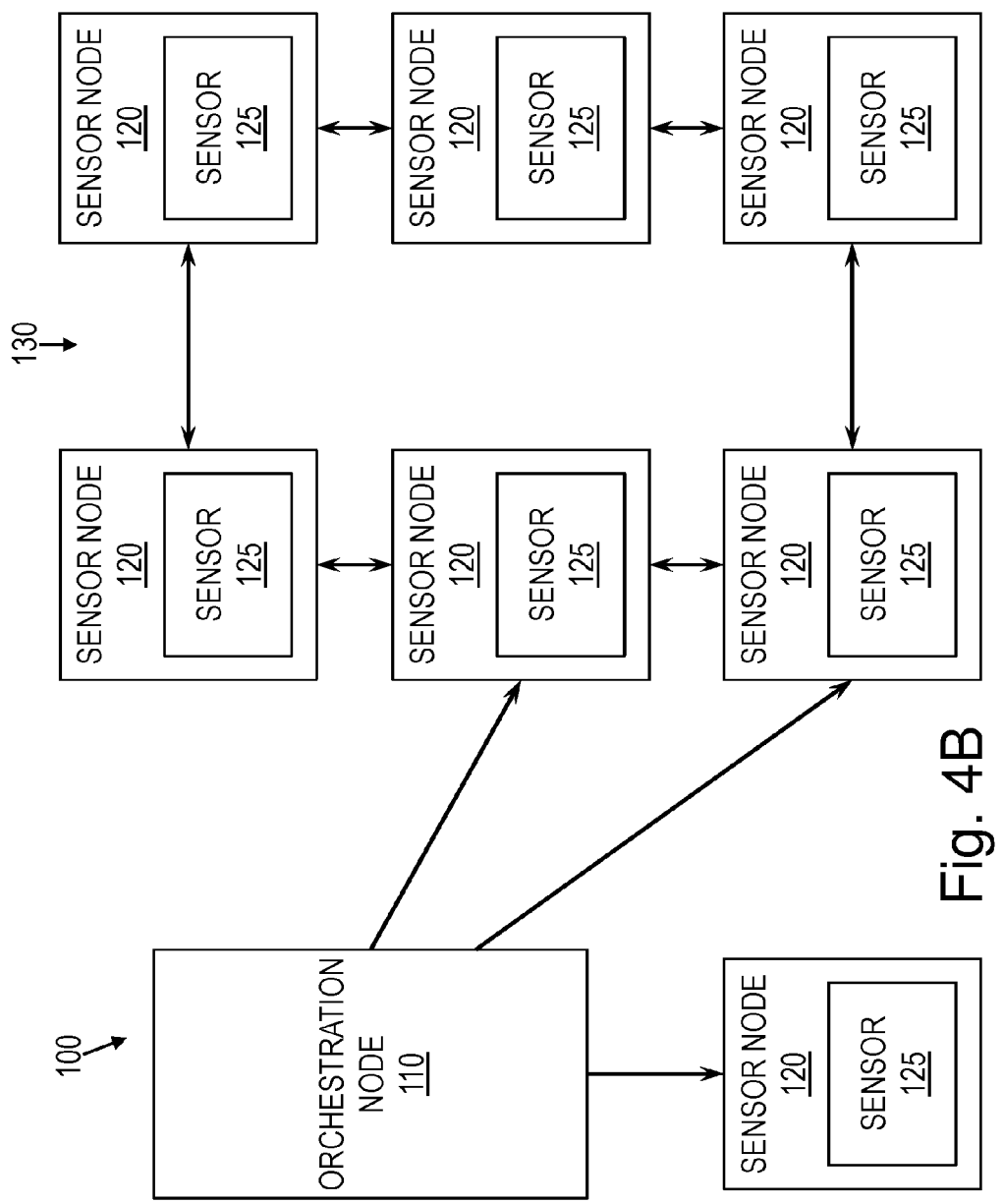

FIG. 4B is a block diagram of the monitoring system 100, providing the instructions of blocks 330 through 350 to update monitoring within the ring 130, according to some embodiments of this disclosure. As shown, each of the new sensor node 120 and the selected sensor nodes 120 may be in communication with the orchestration node 110 to receive instructions regarding where heartbeat packets should be sent and from where they should be expected.

Figure 4C:
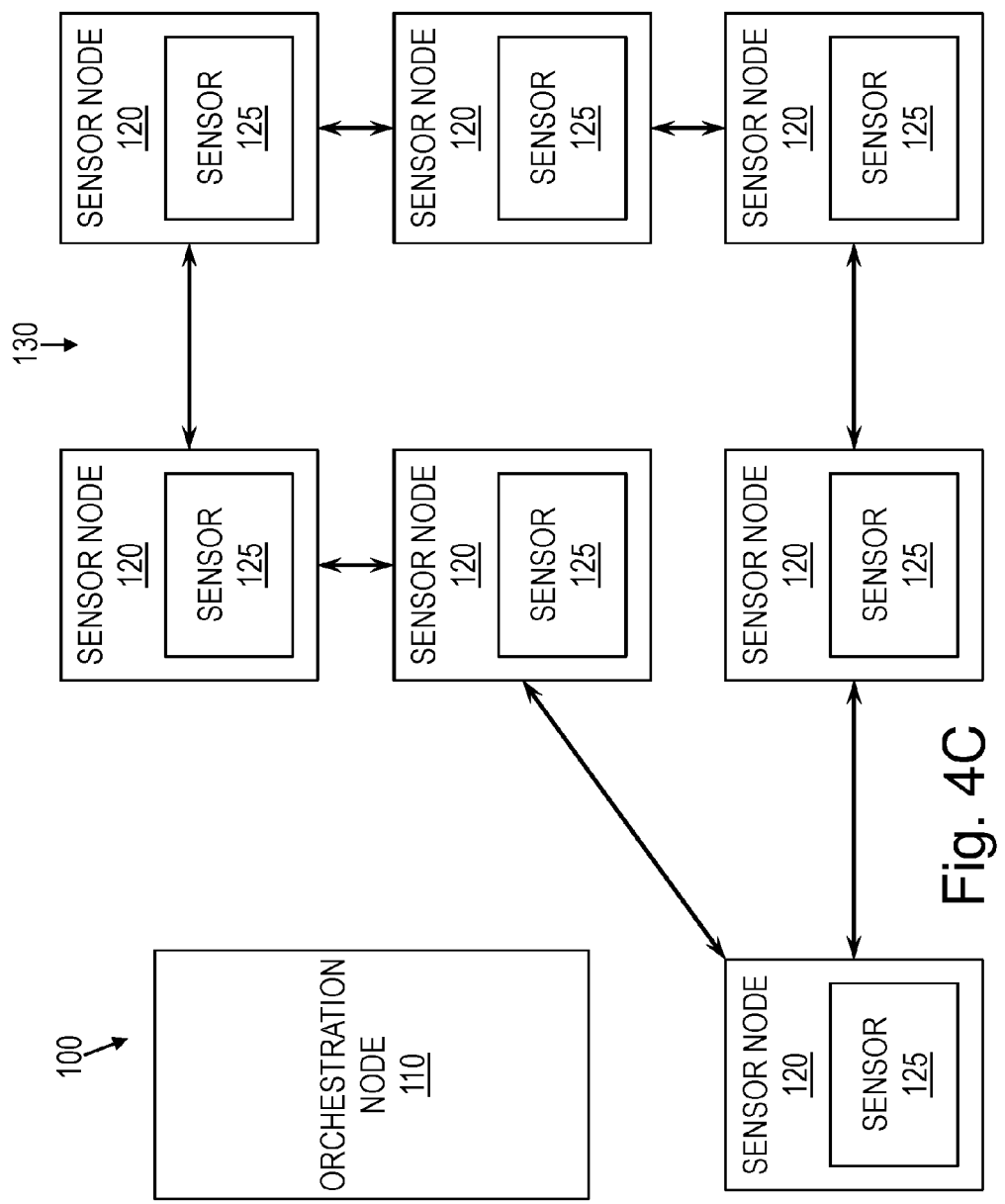

Returning to FIG. 3, at block 360, the new sensor node 120 and each of the selected sensor nodes 120 may begin monitoring each other, by sending and receiving heartbeat packets as newly instructed. FIG. 4C is a block diagram of the monitoring system 100, after addition of the new sensor node 120, according to some embodiments of this disclosure. As shown, the new sensor node 120 has now become a part of the ring 130 of sensor nodes 120 monitoring one another.

As discussed above, a first sensor node 120 may report to the orchestration node 110 if the first sensor node 120 detects outlier data in an adjacent sensor node 120 or if the first sensor node 120 fails to receive one or more heartbeat packets from an adjacent sensor node 120. Based on the reports received, the orchestration node 110 may determine that a particular sensor node is unreliable or has otherwise failed. In that case, the orchestration node 110 may remove the failed sensor node 120 from the ring 130. Other circumstances may also exist in which the orchestration node 110 removes a sensor node 120 from the ring 130. In either case, the orchestration node 110 may adjust the monitoring of the various sensor nodes 120 to account for the removal.

Figure 6:
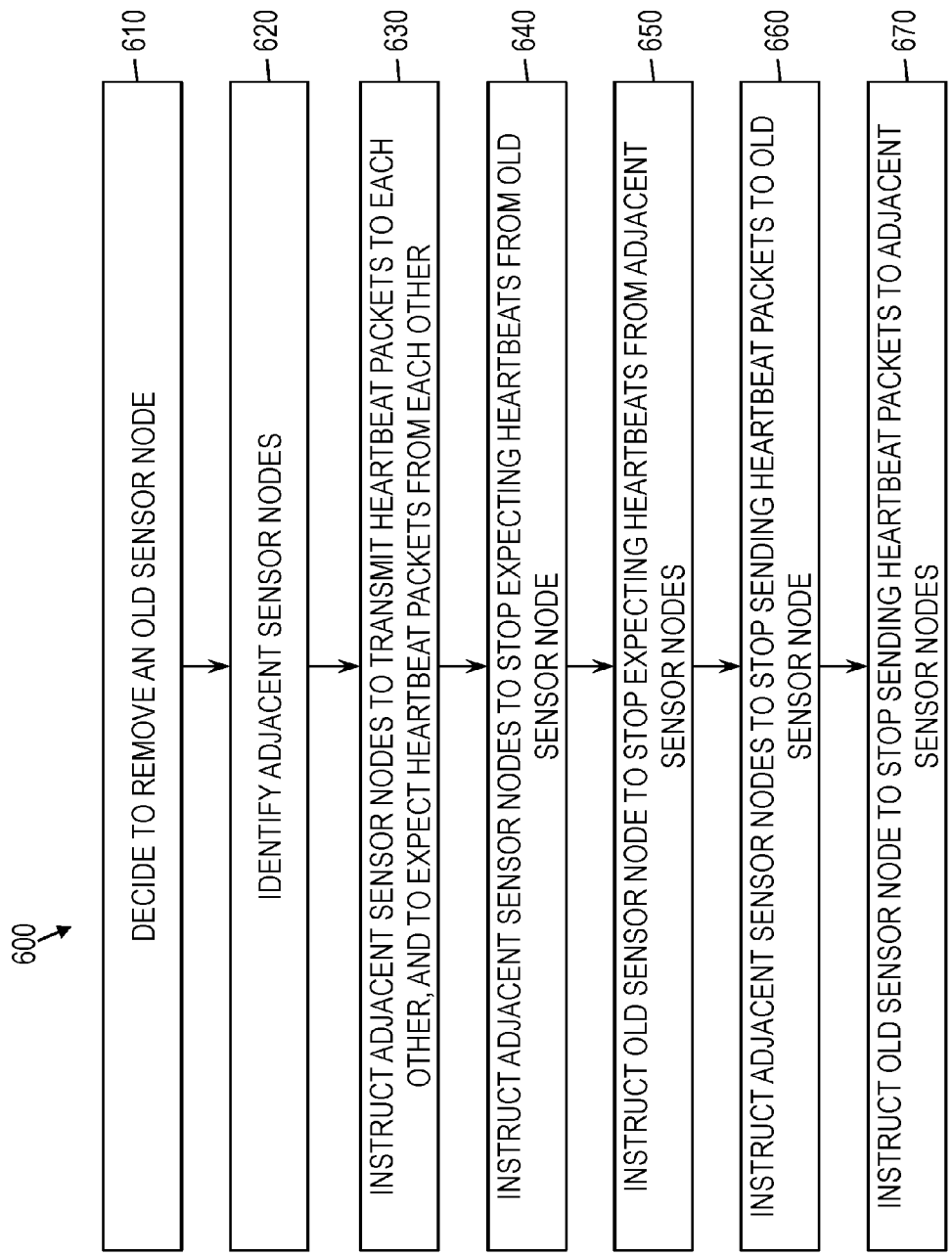
FIG. 6 is a flow diagram of a method for removing a sensor node from the ring of sensor nodes, according to some embodiments of this disclosure.

FIG. 6 is a flow diagram of a method 600 for removing an old sensor node 120 from the ring 130, according to some embodiments of this disclosure. As shown, at block 610, the orchestration node 110 may decide to remove an old sensor node 120. The old sensor node is "old" in the sense that it is currently participating in the ring 130, but will no longer be when the method 600 ends.

At block 620, the orchestration node 110 may identify the sensor nodes 120 adjacent to the old sensor node 120. At block 630, the orchestration node 110 may instruct the adjacent sensor nodes 120 of the old sensor node 120 to transmit heartbeat packets to each other, and to expect heartbeat packets from each other.

At block 640, the orchestration node 110 may instruct the adjacent sensor nodes 120 to stop expecting heartbeat packets from the old sensor node 120. At block 650, the orchestration node 110 may instruct the old sensor node 120 to stop expecting heartbeat packets from the adjacent sensor nodes 120. At block 660, the orchestration node 110 may instruct the adjacent sensor nodes 120 to stop sending heartbeat packets to the old sensor node 120. At block 670, the orchestration node 110 may instruct the old sensor node to stop sending heartbeat packets to the adjacent sensor nodes 120.

As a result, the adjacent sensor nodes 120 of the old sensor node 120 may become adjacent to each other, and the old sensor node 120 may be removed from the ring 130, no longer monitoring and no longer being monitored by other sensor nodes 120 in the ring 130.

Figure 7:
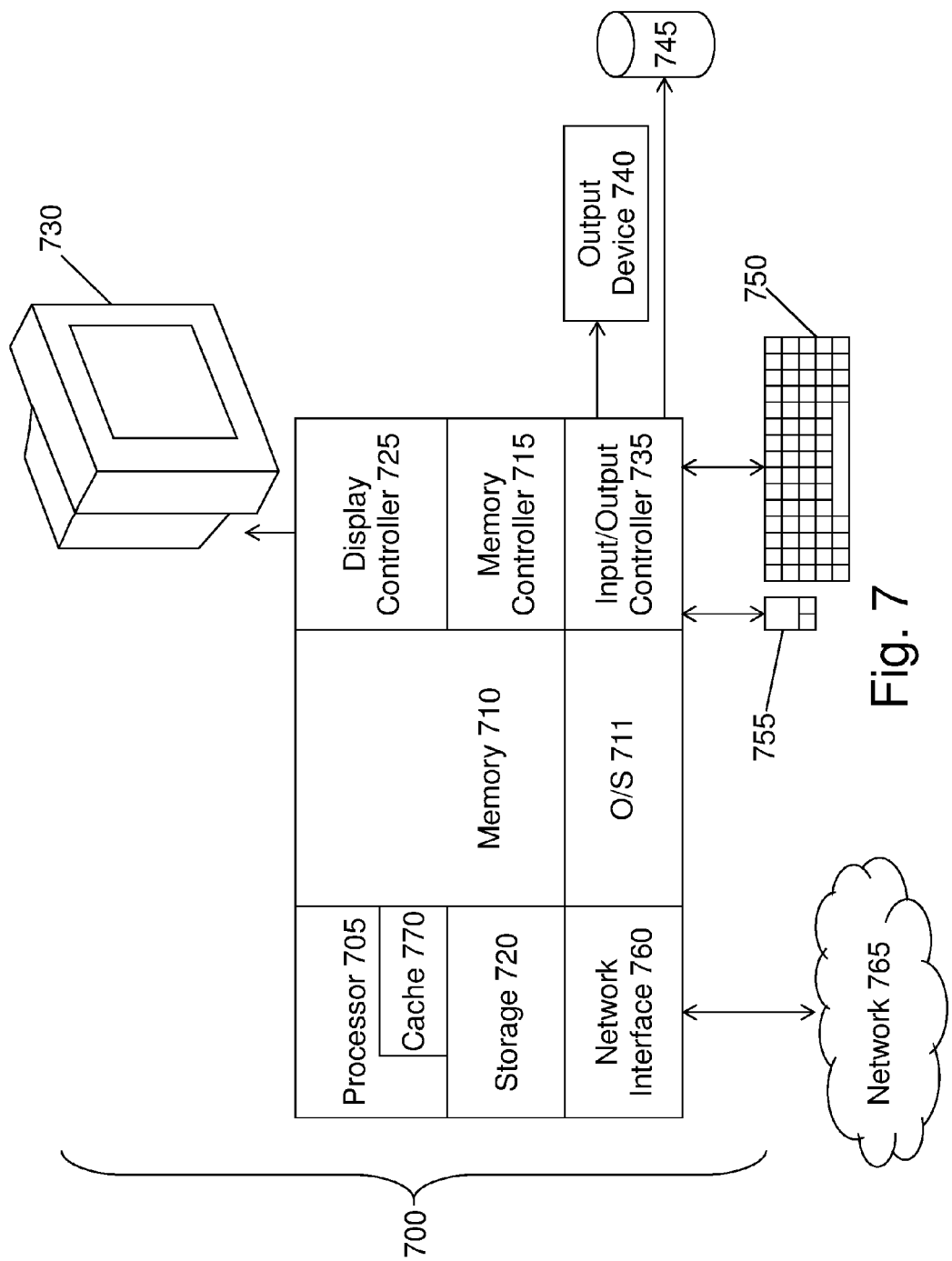
FIG. 7 is a block diagram of a computer system for implementing some or all aspects of the monitoring system, according to some embodiments of this disclosure.

FIG. 7 illustrates a block diagram of a computer system 700 for use in implementing a monitoring system 100 or method 200 according to some embodiments. The monitoring systems 100 and methods 200 described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer. For instance, each sensor node 120 or orchestration node 110 may be a computer system 700.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the monitoring systems 100 and methods 200 of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Monitoring systems 100 and methods 200 according to this disclosure may be embodied, in whole or in part, in computer program products or in computer systems 700, such as that illustrated in FIG. 7.

Technical effects and benefits of some embodiments include providing a scalable, ring-based monitoring system 100 for sensor nodes 120. This approach need not require operator intervention and may reduce communication to as few as a single orchestration node 110. This may keep the compute complexity in the network of sensor nodes 120 low, and may require few resources to ensure the sensors 125 are doing their job.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   arranging two or more sensor nodes into a ring monitor, each sensor node of the ring monitor coupled to a sensor and each sensor node cross-monitoring at least one other sensor node in the ring monitor;
   receiving a request to add a new sensor node to the ring monitor;

generating, by a computer processor, a spatial partitioning of a plane representing locations of the new sensor node and the two or more sensor nodes in the ring monitor, the spatial partitioning comprising a plurality of regions, and each region corresponding to a sensor node;

selecting two or more adjacent sensor nodes from the two or more sensor nodes in the ring monitor, based at least in part on the spatial partitioning;

instructing the two or more adjacent sensor nodes to monitor the new sensor node; and instructing the new sensor node to monitor each of the two or more adjacent sensor nodes.

2. The computer-implemented method of claim 1, wherein:
the generating the spatial partitioning of the plane representing locations of the new sensor node and the two or more sensor nodes in the ring monitor comprises generating a Voronoi diagram representing the locations of the new sensor node and the two or more sensor nodes in the ring monitor; and
the selecting the two or more adjacent sensor nodes from the two or more sensor nodes in the ring monitor comprises selecting a first sensor node and a second sensor node that correspond to first and second regions adjacent to a new region corresponding to the new sensor node in the Voronoi diagram.

3. The computer-implemented method of claim 1, wherein:
instructing the two or more adjacent sensor nodes to monitor the new sensor node comprises:
  instructing the two or more adjacent sensor nodes to expect heartbeat packets from the new sensor node; and
  instructing the new sensor node to transmit heartbeat packets to the two or more adjacent sensor nodes; and
instructing the new sensor node to monitor each of the two or more adjacent sensor nodes comprises:
  instructing the new sensor node to expect heartbeat packets from each of two or more adjacent sensor nodes; and
  instructing the two or more adjacent sensor nodes to transmit heartbeat packets to the new sensor node.

4. The computer-implemented method of claim 3, wherein each heartbeat package comprises an outlier detection payload, and wherein the new sensor node is configured to determine whether each of the two or more adjacent sensor nodes have sensors detecting outlier data.

5. The computer-implemented method of claim 3, further comprising:
receiving a report from a least one of the two or more adjacent sensor nodes that an expected heartbeat packet was not received from the new sensor node; and
removing the new sensor node from the ring monitor, responsive to the report.

6. The computer-implemented method of claim 1, further comprising removing a first sensor node from the ring monitor, and the removing comprising:
identifying a first adjacent node and a second adjacent node that are sensor nodes adjacent to the first sensor node in the ring monitor;
instructing the first adjacent node and the second adjacent node to transmit heartbeat packets to each other;
instructing the first adjacent node and the second adjacent node to expect heartbeat packets from each other; and
instructing the first adjacent node and the second adjacent node to stop expecting heartbeat packets from the first sensor node.

7. The computer-implemented method of claim 1, wherein each sensor node in the two or more sensor nodes of the ring monitor receives heartbeat packets from two other sensor nodes in the ring monitor and expects heartbeat packets from the two other sensor nodes in the ring monitor.

8. A system comprising:
a memory having computer readable instructions; and
one or more processors for executing the computer readable instructions, the computer readable instructions comprising:
  arranging two or more sensor nodes into a ring monitor, each sensor node of the ring monitor coupled to a sensor and each sensor node cross-monitoring at least one other sensor node in the ring monitor;
  receiving a request to add a new sensor node to the ring monitor;
  generating a spatial partitioning of a plane representing locations of the new sensor node and the two or more sensor nodes in the ring monitor, the spatial partitioning comprising a plurality of regions, and each region corresponding to a sensor node;
  selecting two or more adjacent sensor nodes from the two or more sensor nodes in the ring monitor, based at least in part on the spatial partitioning;
  instructing the two or more adjacent sensor nodes to monitor the new sensor node; and
  instructing the new sensor node to monitor each of the two or more adjacent sensor nodes.

9. The system of claim 8, wherein:
the generating the spatial partitioning of the plane representing locations of the new sensor node and the two or more sensor nodes in the ring monitor comprises generating a Voronoi diagram representing the locations of the new sensor node and the two or more sensor nodes in the ring monitor; and
the selecting the two or more adjacent sensor nodes from the two or more sensor nodes in the ring monitor comprises selecting a first sensor node and a second sensor node that correspond to first and second regions adjacent to a new region corresponding to the new sensor node in the Voronoi diagram.

10. The system of claim 8, wherein:
instructing the two or more adjacent sensor nodes to monitor the new sensor node comprises:
  instructing the two or more adjacent sensor nodes to expect heartbeat packets from the new sensor node; and
  instructing the new sensor node to transmit heartbeat packets to the two or more adjacent sensor nodes; and
instructing the new sensor node to monitor each of the two or more adjacent sensor nodes comprises:
  instructing the new sensor node to expect heartbeat packets from each of two or more adjacent sensor nodes; and
  instructing the two or more adjacent sensor nodes to transmit heartbeat packets to the new sensor node.

11. The system of claim 10, wherein each heartbeat package comprises an outlier detection payload, and wherein the new sensor node is configured to determine whether each of the two or more adjacent sensor nodes have sensors detecting outlier data.

12. The system of claim 10, the computer readable instructions further comprising:
receiving a report from a least one of the two or more adjacent sensor nodes that an expected heartbeat packet was not received from the new sensor node; and
removing the new sensor node from the ring monitor, responsive to the report.

13. The system of claim 8, the computer readable instructions further comprising removing a first sensor node from the ring monitor, and the removing comprising:
- identifying a first adjacent node and a second adjacent node that are sensor nodes adjacent to the first sensor node in the ring monitor;
- instructing the first adjacent node and the second adjacent node to transmit heartbeat packets to each other;
- instructing the first adjacent node and the second adjacent node to expect heartbeat packets from each other; and
- instructing the first adjacent node and the second adjacent node to stop expecting heartbeat packets from the first sensor node.

14. The system of claim 8, wherein each sensor node in the two or more sensor nodes of the ring monitor receives heartbeat packets from two other sensor nodes in the ring monitor and expects heartbeat packets from the two other sensor nodes in the ring monitor.

15. A computer program product for ring-based monitoring of sensor nodes, the computer program product comprising a computer readable storage medium having program instructions embodied therewith, the program instructions executable by a processor to cause the processor to perform a method comprising:
- arranging two or more sensor nodes into a ring monitor, each sensor node of the ring monitor coupled to a sensor and each sensor node cross-monitoring at least one other sensor node in the ring monitor;
- receiving a request to add a new sensor node to the ring monitor;
- generating a spatial partitioning of a plane representing locations of the new sensor node and the two or more sensor nodes in the ring monitor, the spatial partitioning comprising a plurality of regions, and each region corresponding to a sensor node;
- selecting two or more adjacent sensor nodes from the two or more sensor nodes in the ring monitor, based at least in part on the spatial partitioning;
- instructing the two or more adjacent sensor nodes to monitor the new sensor node; and
- instructing the new sensor node to monitor each of the two or more adjacent sensor nodes.

16. The computer program product of claim 15, wherein:
the generating the spatial partitioning of the plane representing locations of the new sensor node and the two or more sensor nodes in the ring monitor comprises generating a Voronoi diagram representing the locations of the new sensor node and the two or more sensor nodes in the ring monitor; and
the selecting the two or more adjacent sensor nodes from the two or more sensor nodes in the ring monitor comprises selecting a first sensor node and a second sensor node that correspond to first and second regions adjacent to a new region corresponding to the new sensor node in the Voronoi diagram.

17. The computer program product of claim 15, wherein:
instructing the two or more adjacent sensor nodes to monitor the new sensor node comprises:
- instructing the two or more adjacent sensor nodes to expect heartbeat packets from the new sensor node; and
- instructing the new sensor node to transmit heartbeat packets to the two or more adjacent sensor nodes; and instructing the new sensor node to monitor each of the two or more adjacent sensor nodes comprises:
- instructing the new sensor node to expect heartbeat packets from each of two or more adjacent sensor nodes; and
- instructing the two or more adjacent sensor nodes to transmit heartbeat packets to the new sensor node.

18. The computer program product of claim 17, wherein each heartbeat package comprises an outlier detection payload, and wherein the new sensor node is configured to determine whether each of the two or more adjacent sensor nodes have sensors detecting outlier data.

19. The computer program product of claim 17, the method further comprising:
- receiving a report from a least one of the two or more adjacent sensor nodes that an expected heartbeat packet was not received from the new sensor node; and
- removing the new sensor node from the ring monitor, responsive to the report.

20. The computer program product of claim 15, the method further comprising removing a first sensor node from the ring monitor, and the removing comprising:
- identifying a first adjacent node and a second adjacent node that are sensor nodes adjacent to the first sensor node in the ring monitor;
- instructing the first adjacent node and the second adjacent node to transmit heartbeat packets to each other;
- instructing the first adjacent node and the second adjacent node to expect heartbeat packets from each other; and
- instructing the first adjacent node and the second adjacent node to stop expecting heartbeat packets from the first sensor node.

* * * * *